US011133876B2

(12) United States Patent
Nocon

(10) Patent No.: US 11,133,876 B2
(45) Date of Patent: Sep. 28, 2021

(54) INTERACTIVE DEVICE WITH MULTIPLE ANTENNAS

(71) Applicant: Disney Enterprises, Inc., Burbank, CA (US)

(72) Inventor: Nathan D. Nocon, Valencia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 80 days.

(21) Appl. No.: 16/003,633

(22) Filed: Jun. 8, 2018

(65) Prior Publication Data

US 2019/0379465 A1 Dec. 12, 2019

(51) Int. Cl.
*H04B 17/23* (2015.01)
*H01Q 25/04* (2006.01)

(52) U.S. Cl.
CPC ............ *H04B 17/23* (2015.01); *H01Q 25/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,336,530 A * | 8/1967 | Sloan | .................. | G01S 1/02 342/386 |
| 4,227,196 A * | 10/1980 | Langeraar | ................. | G01S 3/30 342/444 |
| 5,648,862 A * | 7/1997 | Owen | ..................... | H04B 10/11 342/45 |
| 6,799,035 B1 * | 9/2004 | Cousins | ............... | G06K 7/0008 455/418 |
| 8,184,983 B1 * | 5/2012 | Ho | .......................... | H04B 11/00 345/156 |
| 8,336,245 B2 * | 12/2012 | Lalor | ..................... | F41C 27/00 119/720 |
| 8,989,665 B2 * | 3/2015 | Geris | ................... | H04B 1/3838 455/41.2 |
| 2002/0118147 A1 * | 8/2002 | Solomon | ................. | G09F 27/00 345/30 |
| 2003/0098801 A1 * | 5/2003 | Martin | ................ | G08G 1/0965 340/902 |
| 2004/0157583 A1 * | 8/2004 | Matsumoto | ....... | H04W 12/0013 455/410 |
| 2006/0132305 A1 * | 6/2006 | Ho | ........................... | G01S 3/40 340/539.32 |
| 2008/0042827 A1 * | 2/2008 | Ho | ..................... | G08B 13/1427 340/539.13 |
| 2008/0125041 A1 * | 5/2008 | Angelhag | .......... | H04N 5/23293 455/41.2 |
| 2008/0220715 A1 * | 9/2008 | Sinha | ................... | H04W 48/04 455/1 |

(Continued)

FOREIGN PATENT DOCUMENTS

GB 2441395 A * 3/2008 .............. G01S 3/38

*Primary Examiner* — Zhitong Chen

(74) *Attorney, Agent, or Firm* — Patterson + Sheridan, LLP

(57) ABSTRACT

A method and related system and apparatus are described, in which the method comprises detecting a predefined event using an omnidirectional antenna of a first interactive device, and responsive to detecting the predefined event, enabling a directional antenna of the first interactive device. The method further comprises transmitting a first signal using the directional antenna, and responsive to receiving the first signal at a second interactive device, performing an audiovisual effect.

20 Claims, 6 Drawing Sheets

(56) References Cited

U.S. PATENT DOCUMENTS

| | | | | |
|---|---|---|---|---|
| 2009/0102927 | A1* | 4/2009 | Tatsuta | H04B 7/04 |
| | | | | 348/192 |
| 2013/0178174 | A1* | 7/2013 | Geris | H04B 1/3838 |
| | | | | 455/90.3 |
| 2015/0031299 | A1* | 1/2015 | Holman | H04W 4/70 |
| | | | | 455/41.2 |
| 2015/0241153 | A1* | 8/2015 | Mardirossian | F41A 17/08 |
| | | | | 42/70.11 |
| 2017/0285754 | A1* | 10/2017 | Holman | G06F 1/1686 |
| 2018/0322335 | A1* | 11/2018 | Golan | G06F 3/011 |
| 2018/0329511 | A1* | 11/2018 | Aman | A63G 31/00 |
| 2019/0007621 | A1* | 1/2019 | Lagnado | H04N 5/445 |
| 2019/0103030 | A1* | 4/2019 | Banga | G08G 5/0013 |

\* cited by examiner

INTERACTIVE DEVICE WITH MULTIPLE ANTENNAS

BACKGROUND

Field of the Disclosure

Embodiments presented in this disclosure generally relate to interactive user experiences, and more specifically techniques for communication between interactive devices using multiple antennas.

Description of the Related Art

One prevailing goal of interactive user experiences is providing a "seamless" interconnection of users, interactive devices, and/or computing devices. To provide the appearance of a seamless interactive experience, the interactive devices and/or computing devices may be communicatively coupled using wireless technologies, which may include directional and/or non-directional wireless technologies. In some cases, however, the directional and non-directional wireless technologies are unable to communicate directly. Thus, implementations of an interactive device may require independent hardware components to support the directional and non-directional wireless technologies, which tends to add cost and complexity when implementing the interactive device.

SUMMARY

In one embodiment, a method comprises detecting a predefined event using an omnidirectional antenna of a first interactive device, and responsive to detecting the predefined event, enabling a directional antenna of the first interactive device. The method further comprises transmitting a first signal using the directional antenna, and responsive to receiving the first signal at a second interactive device, performing an audiovisual effect.

In another embodiment, a system comprises a first interactive device comprising controller circuitry that is communicatively coupled with an omnidirectional antenna and a directional antenna. The controller circuitry is configured to detect a predefined event using the omnidirectional antenna, and responsive to detecting the predefined event, enable the directional antenna. The controller circuitry is further configured to transmit a first signal using the directional antenna. The system further comprises a second interactive device configured to perform an audiovisual effect responsive to receiving the first signal.

In yet another embodiment, an apparatus comprises an omnidirectional antenna, a directional antenna, and controller circuitry that is communicatively coupled with the omnidirectional antenna and the directional antenna. The controller circuitry is configured to detect a predefined event using the omnidirectional antenna, and responsive to detecting the predefined event, enable the directional antenna. The controller circuitry is further configured to transmit a first signal using the directional antenna. An audiovisual effect is performed responsive to receiving the first signal at an interactive device.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Various embodiments described herein are directed to an interactive device comprising a plurality of antennas. The plurality of antennas may comprise a directional antenna (or another suitable apparatus for radiating radio frequency (RF) signals) and an omnidirectional antenna. A predefined event may be detected using the omnidirectional antenna, and the interactive device may enable the directional antenna responsive thereto. The interactive device may transmit a first signal using the directional antenna. Responsive to receiving the first signal at a second interactive device, an audiovisual effect is performed.

In some embodiments, detecting the predefined event using the omnidirectional antenna comprises transmitting a second signal based on sensor data of one or more sensors of the interactive device, and receiving a third signal from a mobile computing device indicating that the sensor data corresponds to a predefined gesture performed using the first interactive device. In some other embodiments, detecting the predefined event using the omnidirectional antenna comprises receiving a second signal from a mobile computing device, wherein the second signal is based on a predefined sequence specified by an application executing on the mobile computing device. In some other embodiments, detecting the predefined event using the omnidirectional antenna comprises receiving a second signal from a mobile computing device, wherein the second signal places the interactive device in a timed mode for transmitting signals using the directional antenna. The mobile computing device may transmit at least a third signal to place other interactive devices into a predetermined receive mode.

In some embodiments, enabling the directional antenna of the interactive device comprises disabling the omnidirectional antenna. In some embodiments, the interactive device comprises switching circuitry that is configured to enable, responsive to a received select signal, a selected one of the omnidirectional antenna and the directional antenna.

In some embodiments, the interactive device is configured to communicate according to the same protocol when using the directional antenna and the omnidirectional antenna. One non-limiting example of a suitable protocol is Bluetooth® low energy (BLE) technology (Bluetooth® is a registered trademark of the Bluetooth Special Interest Group).

Beneficially, embodiments of the interactive device may employ shared hardware to support both directional and non-directional wireless technologies, which results in a reduced cost and/or complexity of the interactive device.

Figure 1:
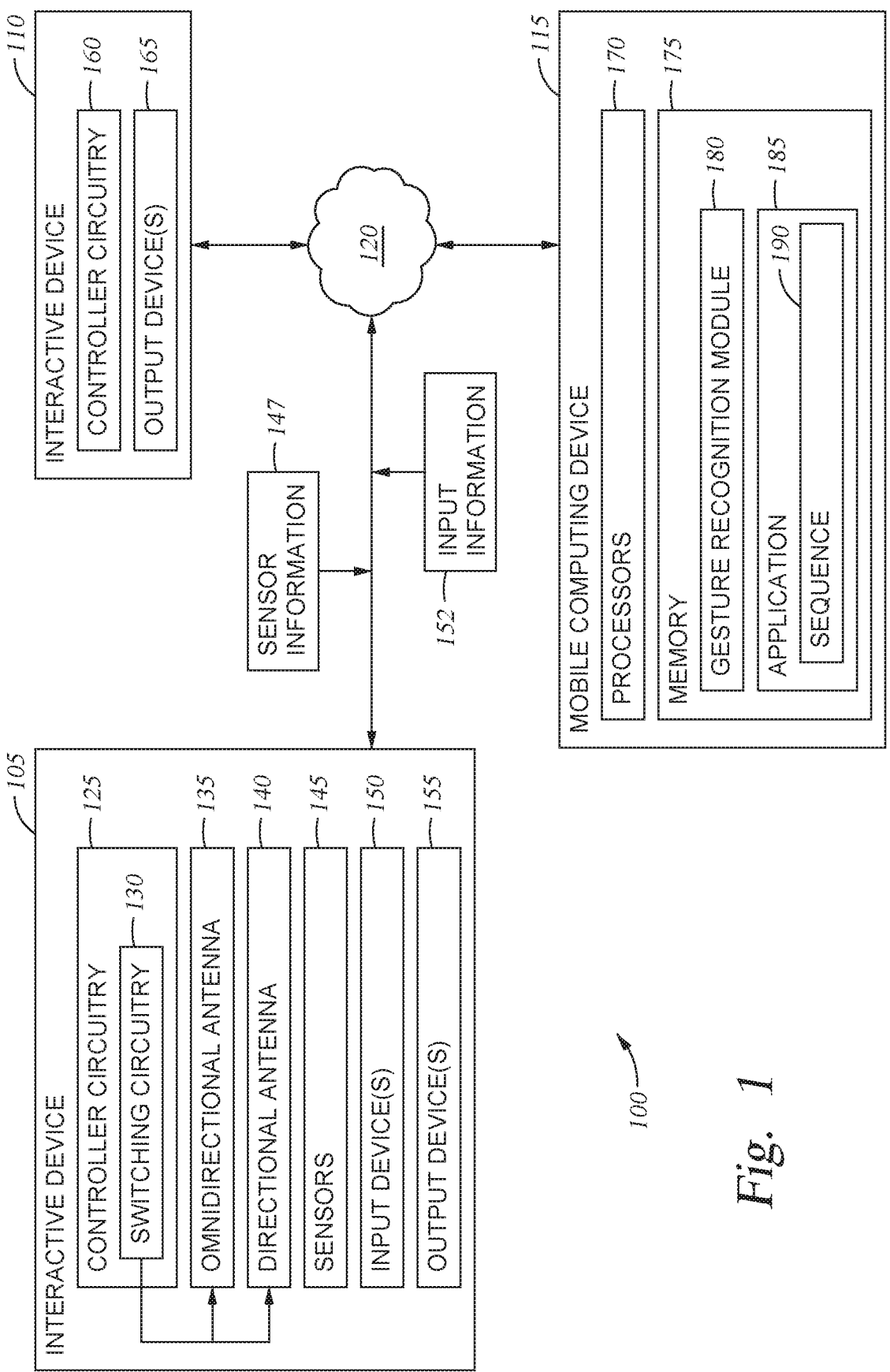
FIG. 1 is a block diagram of an exemplary system with interactive devices, according to one or more embodiments.

FIG. 1 is a block diagram of an exemplary system 100 with interactive devices, according to one or more embodiments. The system 100 may represent an interactive environment, in which one or more users manipulate interactive devices 105, 110 within the context of a storytelling, gameplay, or other interactive experience. For example, output devices 155, 165 included with the interactive devices 105, 110 and/or other devices (e.g., a mobile computing device 115) may be used to provide visual, audio, and/or haptic outputs according to a narrative or gameplay parameters, and the outputs help to establish an immersive experience for the one or more users.

The interactive device 105 is communicatively coupled with the interactive device 110 through the network 120. The interactive device 105 is also communicatively coupled with the mobile computing device 115 through the network 120. The interactive device 110 is also communicatively coupled with the mobile computing device 115 through the network 120. The network 120 may include one or more networks of various types, including a personal area network (PAN), a local area or local access network (LAN), a general wide area network (WAN), and/or a public network (e.g., the Internet). In some embodiments, the network 120 comprises a decentralized, wireless ad hoc network that may support dynamic changes to the composition of the system 100 (e.g., adding or removing the interactive devices 105, 110 and/or the mobile computing device 115).

The interactive devices 105, 110 may be implemented in any suitable form(s). In some embodiments, at least one of the interactive devices 105, 110 is configured to be body-worn or carried by a user. Some non-limiting examples of the interactive devices 105, 110 include toy blasters, light swords, magic scepters, and magic wands. In some embodiments, at least one of the interactive devices 105, 110 is configured to be statically or dynamically positioned within the environment. In one non-limiting example of a shooting gallery environment, the interactive device 105 may comprise a toy blaster and the interactive device 110 may comprise a fixed or movable target at which the toy blaster is aimed by the user.

The mobile computing device 115 may be implemented in any suitable form, such as a body-worn computing device such as a smartwatch or smartglasses, carried devices such as a smartphone or tablet, and so forth. The mobile computing device 115 comprises one or more computer processors 170 and a memory 175. The one or more computer processors 170 represent any number of processing elements that each can include any number of processing cores. Some non-limiting examples of the one or more computer processors 170 include a microprocessor, a digital signal processor (DSP), an application-specific integrated chip (ASIC), and a field programmable gate array (FPGA), or combinations thereof. The memory 175 may comprise volatile memory elements (such as random access memory), non-volatile memory elements (such as solid-state, magnetic, optical, or Flash-based storage), and combinations thereof. Moreover, the memory 175 may be distributed across different mediums (e.g., network storage or external hard drives).

The memory 175 may comprise one or more "modules" for performing various functions described herein. In one embodiment, each module includes program code that is executable by one or more of the computer processors 170. However, other embodiments may include modules that are partially or fully implemented in hardware (i.e., circuitry) or firmware of the mobile computing device 115. As shown, the memory 175 comprises a gesture recognition module 180 configured to detect one or more predefined gestures that are performed by a user using the interactive devices 105, 110. In some embodiments, the gesture recognition module 180 is configured to interpret sensor information 147 and/or input information 152 to detect one or more predefined gestures performed by a user using the interactive device 105.

The memory 175 further comprises an application 185 comprising program code that is executable by one or more of the computer processors 170. The application 185 is generally used to provide the context of the interactive environment, such as a storytelling narrative, gameplay, or other interactive experience. For example, the application 185 may coordinate audio, visual, and/or haptic outputs provided by the interactive devices 105, 110 and/or the mobile computing device 115 to support the narrative and/or gameplay. In some embodiments, the mobile computing device 115 transmits control signals over the network 120 according to a predefined sequence 190 specified by the application 185. For example, the mobile computing device 115 may cause a plurality of interactive devices (e.g., multiple ones of the interactive device 110) to illuminate according to the predefined sequence 190.

Controller circuitry 125 of the interactive device 105 comprises one or more computer processors and a memory, though not visually depicted in the interactive device 105. The one or more computer processors represent any number of processing elements that each can include any number of processing cores. Some non-limiting examples of the one or more computer processors include a microprocessor, a digital signal processor (DSP), an application-specific integrated chip (ASIC), and a field programmable gate array (FPGA), or combinations thereof. The memory may comprise volatile memory elements (such as random access memory), non-volatile memory elements (such as solid-state, magnetic, optical, or Flash-based storage), and combinations thereof. Moreover, the memory may be distributed across different mediums (e.g., network storage or external hard drives).

The controller circuitry 125 is communicatively coupled with an omnidirectional antenna 135 and a directional antenna 140. The omnidirectional antenna 135 and the directional antenna 140 may have any suitable form. In some embodiments, the omnidirectional antenna 135 and/or the directional antenna 140 may be disposed within a housing of the interactive device 105.

In some embodiments, the controller circuitry 125 is configured to wirelessly communicate signals using one or both of the omnidirectional antenna 135 and the directional antenna 140. The controller circuitry 125 may be configured to communicate using any suitable protocol(s), whether based on known standards or proprietary network protocols. Some non-limiting examples of suitable protocols include Bluetooth® low energy (BLE) technology and the Institute of Electrical and Electronics Engineers (IEEE) 802.15.4™ standard for wireless personal area networks (802.15.4™ is a trademark of IEEE). In some embodiments, the controller circuitry 125 of the interactive device 105 is configured to communicate according to the same protocol when using the directional antenna 140 and when using the omnidirectional antenna 135.

In some embodiments, the controller circuitry 125 comprises switching circuitry 130 that is configured to enable a selected one of the omnidirectional antenna 135 and the directional antenna 140. For example, the switching circuitry 130 may comprise of an RF switch coupled with a transmitter of the controller circuitry 125, a demultiplexer coupled with the transmitter, and so forth. In some embodiments, the interactive device 105 in a default mode uses the omnidirectional antenna 135 to communicate with the mobile computing device 115 and/or the interactive device 110, and operates the switching circuitry 130 to intermittently communicate using the directional antenna 140. As an example interactive device 105 blasts interactive device 110 using the temporally activated directional antenna which in turn registers a hit with mobile computing device 115.

In some embodiments, the interactive device 110 may have a configuration and/or functionality that are comparable to the interactive device 105. For example, although not shown, the interactive device 110 may include both an omnidirectional antenna and a directional antenna. The controller circuitry 160 of the interactive device 110 may have a comparable functionality to the controller circuitry 125. However, in other embodiments, the interactive device 110 may have a different functionality than the interactive device 105.

Signals that are transmitted over the network 120 by the interactive devices 105, 110 may be based on the operation or manipulation of the interactive devices 105, 110 by the one or more users. In some embodiments, the interactive device 105 comprises one or more sensors 145 configured to generate sensor information 147. Some non-limiting examples of the sensors 145 include inertial measurement units, absolute position sensors, relative position sensors, and so forth. In some embodiments, the interactive device 105 comprises one or more input devices 150 configured to generate input information 152 responsive to input received from a user. Some non-limiting examples of the one or more input devices 150 include triggers, switches, buttons, microphones or other audio inputs, cameras or other visual inputs, and so forth.

In some embodiments, the controller circuitry 125 may transmit information based on the sensor information 147 and/or the input information 152, using the selected one of the omnidirectional antenna 135 and the directional antenna 140. In some embodiments, the controller circuitry 125 is configured to transmit the sensor information 147 and/or the input information 152 onto the network 120 without substantial processing thereof. For example, the controller circuitry 125 may transmit sensor information 125 to the mobile computing device 115, and the mobile computing device 115 may use a gesture recognition module 180 to interpret the sensor information 125 and detect one or more gestures performed using the interactive device 105.

Beneficially, by offloading processing tasks associated with the gesture recognition module 180 and the application 185 to the processors 170 of the mobile computing device 115, the interactive devices 105, 110 may have a lower cost implementation and/or reduced power consumption. However, other embodiments may have the processing tasks associated with the gesture recognition module 180 and/or the application 185 performed by the controller circuitry 125, 160. For example, the controller circuitry 125 of the interactive device 105 may detect one or more predefined gestures based on the sensor information 147 and/or the input information 152, and may communicate the gesture information over the network 120 to the mobile computing device 115.

In some alternate embodiments, the functionality of the interactive device 105 may be independent from control signals from the mobile computing device 115. For example, the controller circuitry 125 of the interactive device 105 may be configured to enter a timed mode for transmitting signals using the directional antenna 140. Other interactive devices of the system 100 (e.g., the interactive device 110) may operate in a predetermined receive mode.

Figure 6:
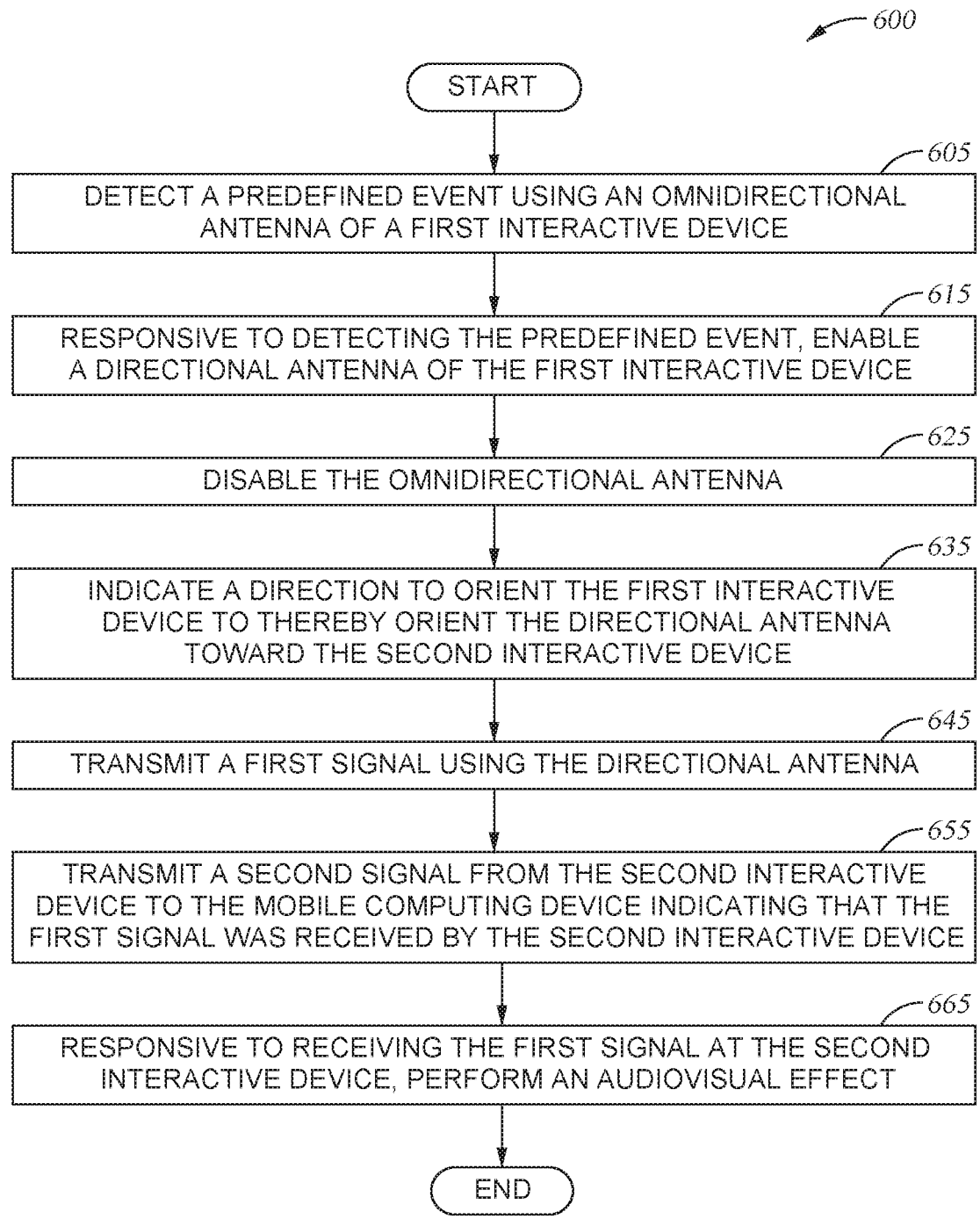
FIG. 6 illustrates an exemplary method of communicating between multiple interactive devices, according to one or more embodiments.

Now referring also to FIG. 6, which illustrates an exemplary method 600 of communicating between multiple interactive devices, the method 600 begins at block 605, where a predefined event is detected using an omnidirectional antenna 135 of a first interactive device 105. In some embodiments, the predefined event corresponds to detecting a predefined gesture that is performed using the first interactive device 105. As discussed above, detecting the predefined gesture may be performed by the mobile computing device 115 or by the first interactive device 105. In other embodiments, the predefined event corresponds to the predefined sequence 190 (e.g., a particular step or iteration of the predefined sequence 190) specified by the application 185.

At block 615, a directional antenna 140 of the first interactive device 105 is enabled responsive to detecting the predefined event. At block 625, the omnidirectional antenna 135 is disabled. For example, in the context of a shooting gallery implementation, the application may instruct the first interactive device 105 (using the omnidirectional antenna) to switch over to transmitting using the directional antenna for a predetermined period of time (e.g., 2 minutes), during which the first interactive device 105 may "blast" at other interactive device(s). Following the predetermined period of time, the first interactive device 105 may switch back to transmitting using the omnidirectional antenna 135.

In some embodiments, blocks 615, 625 are performed using switching circuitry 130 of the first interactive device 105. For example, a select signal provided to the switching circuitry 130 may be responsive to detecting the predefined event. In such a case, the transition between the omnidirectional antenna 135 and the directional antenna 140 may be instantaneous.

At block 635, a direction is indicated to orient the first interactive device 105 to orient the directional antenna 140 toward the second interactive device 110. In some embodiments, one or more output devices 155 of the interactive device 105 are used to provide the indication. For example, a visual output device of the interactive device 105 may be illuminated, may be illuminated in a different color, may flash, and so forth. In another example, an audio output device of the first interactive device 105 may provide verbal instructions for orienting the first interactive device 105. In another example, a visual output device and/or an audio output device of the second interactive device 110 may be used to provide the indicated direction. In some embodiments, the indicated direction is determined based on position information associated with the first interactive device 105 and/or the second interactive device 110.

At block 645, the first interactive device 105 transmits a first signal using the directional antenna 140. In some embodiments, transmitting the first signal is responsive to a user manipulation of the first interactive device 105, such as a press or press-and-hold of a button, performing a predefined gesture (e.g., the act of orienting the first interactive device 105 at block 635), and so forth.

At block 655, the second interactive device 110 transmits a second signal to the mobile computing device 115 indicating that the first signal was received by the second interactive device 110. In the context of the shooting gallery implementation, receiving the first signal at the second interactive device 110 corresponds to a successful "blast"—that is, the user properly oriented the first interactive device 105 toward the second interactive device 110.

In some alternate embodiments, the second interactive device 110 may transmit a receive signal to the first interactive device 105 indicating that the second interactive device 110 received the first signal.

In some embodiments, the application 185 is updated responsive to receiving the second signal. For example, the predefined sequence 190 may be updated to a next iteration after the second signal indicates that the previous iteration was successfully or unsuccessfully completed.

At block 665, an audiovisual effect is performed responsive to receiving the first signal at the second interactive device 110. The audiovisual effect comprises at least one of an audio effect, a visual effect, and a haptic effect. In some cases, the audiovisual effect may indicate that the user performed a task successfully using the first interactive device 105. For example, an illuminated target of the second interactive device 110 may darken, and/or another target of the second interactive device 110 (or another interactive device) may illuminate in accordance with the predefined sequence 190. The method 600 ends following completion of block 665.

Figure 2:
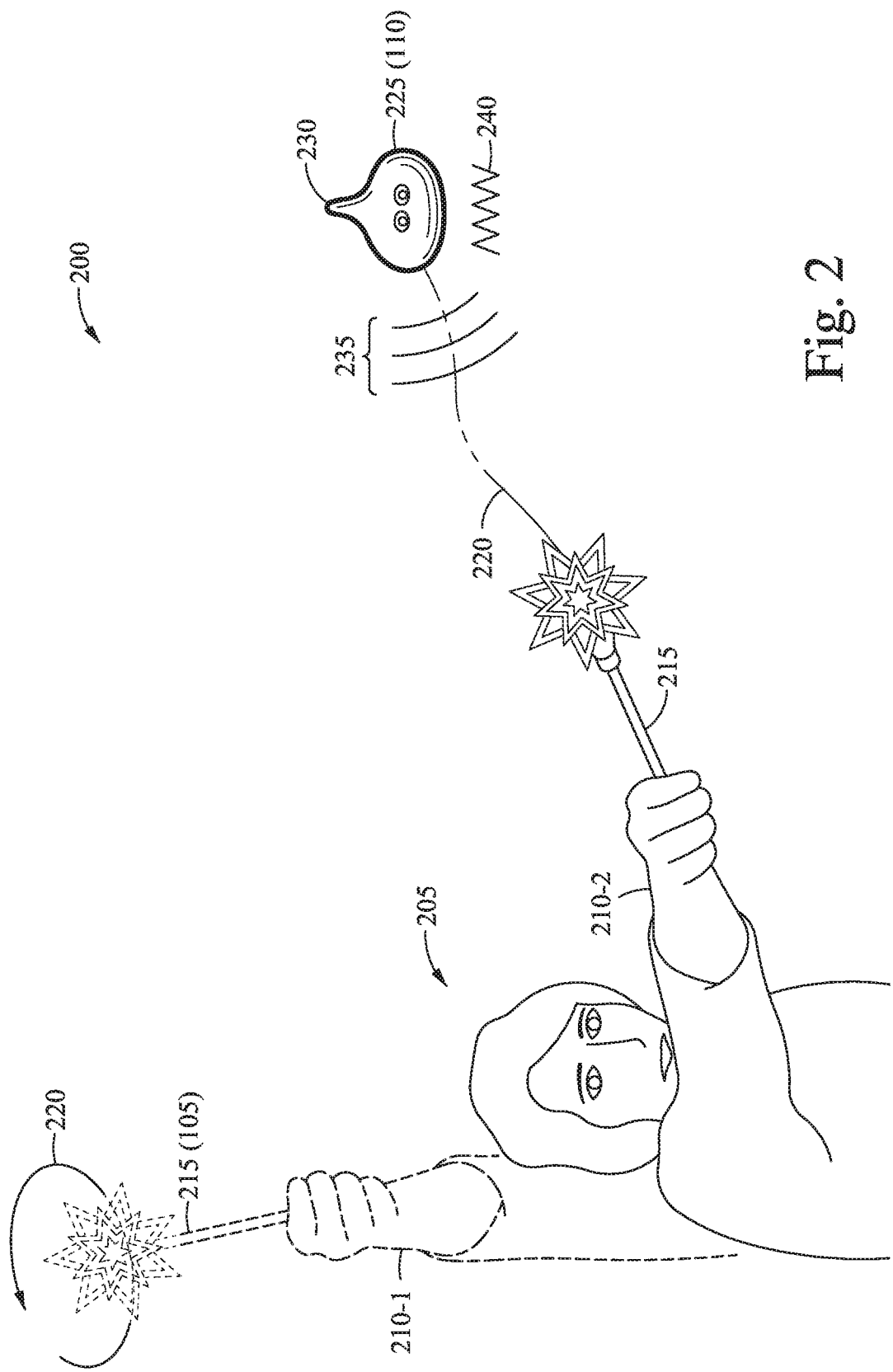
FIG. 2 is a diagram of an exemplary interaction of multiple interactive devices, according to one or more embodiments.

Next, FIG. 2 is a diagram 200 of an exemplary interaction of multiple interactive devices, according to one or more embodiments. The features illustrated in the diagram 200 may be used in conjunction with other embodiments, such as the method 500 of FIG. 5.

In the diagram 200, a user 205 holds a magic scepter 215, which represents one example of the interactive device 105. The interactive device 105 may have any suitable alternate implementation, such as a carried or body-worn toy blaster, a toy sword. A model 225 is arranged at a distance from the user 205 and represents one example of the interactive device 110. In some cases, the model may have the appearance of a character from the storytelling or gameplay experience. The user 205 raises her arm to a first position 210-1, which raises the magic scepter 215 to a near-vertical orientation. In some embodiments, the directional antenna of the magic scepter 215 may be enabled responsive to detecting the predefined gesture of raising the magic scepter 215.

From the first position 210-1, the user 205 waves the magic scepter 215 in a circular motion 220 to simulate "activating" or "charging" the magic scepter 215. In some embodiments, the directional antenna of the magic scepter 215 may be enabled responsive to detecting the predefined gesture of the circular motion 220. Other predefined gestures are also possible for enabling the directional antenna, such as a press or press-and-hold of a button of the magic scepter 215.

In some embodiments, a direction to orient the magic scepter 215 is indicated to the user 205. For example, the model 225 may provide an audio, visual, and/or haptic output, such as illuminating the model in a first color. As discussed above, output device(s) of the magic scepter 215 may alternately be used to provide the indicated direction.

From the first position 210-1, the user 205 lowers her arm to a second position 210-2, which lowers the magic scepter 215 to a near-horizontal orientation. In the second position 210-2, the directional antenna of the magic scepter 215 may be oriented toward the model 225. A signal transmitted by the directional antenna may be received by an antenna of the model 225. In some embodiments, the signal is transmitted responsive to performing a predefined gesture (e.g., the act of orienting the magic scepter 215). In other embodiments, the signal is transmitted responsive to another user input, such as a press or press-and-hold of a button of the magic scepter 215.

The model 225 may perform an audiovisual effect responsive to receiving the signal, such as a visual output 230, an audio output 235, and/or a haptic output 240. In this way, the "aiming" of the magic scepter 215 by the user may simulate "shooting" a beam 220 at the model 225.

Figure 3:
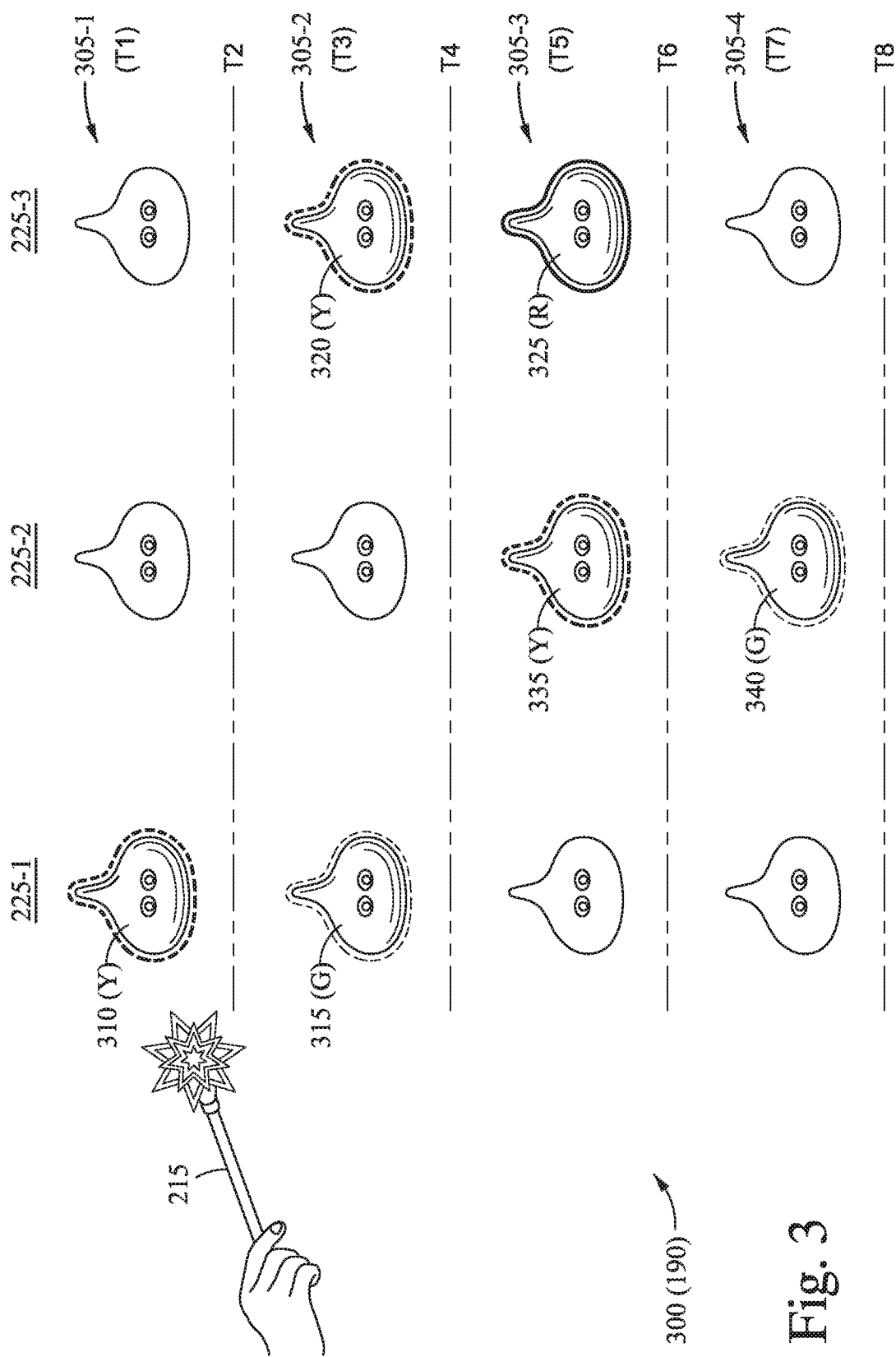
FIG. 3 is a diagram of an exemplary interaction of multiple interactive devices according to a predefined sequence, according to one or more embodiments.

Next, FIG. 3 is a diagram 300 of an exemplary interaction of multiple interactive devices according to a predefined sequence, according to one or more embodiments. More specifically, the diagram 300 illustrates interaction of the magic scepter 215 with a plurality of models 225-1, 225-2, 225-3. In some cases, the plurality of models 225-1, 225-2, 225-3 may be arranged for shooting gallery-type gameplay.

Figure 5:
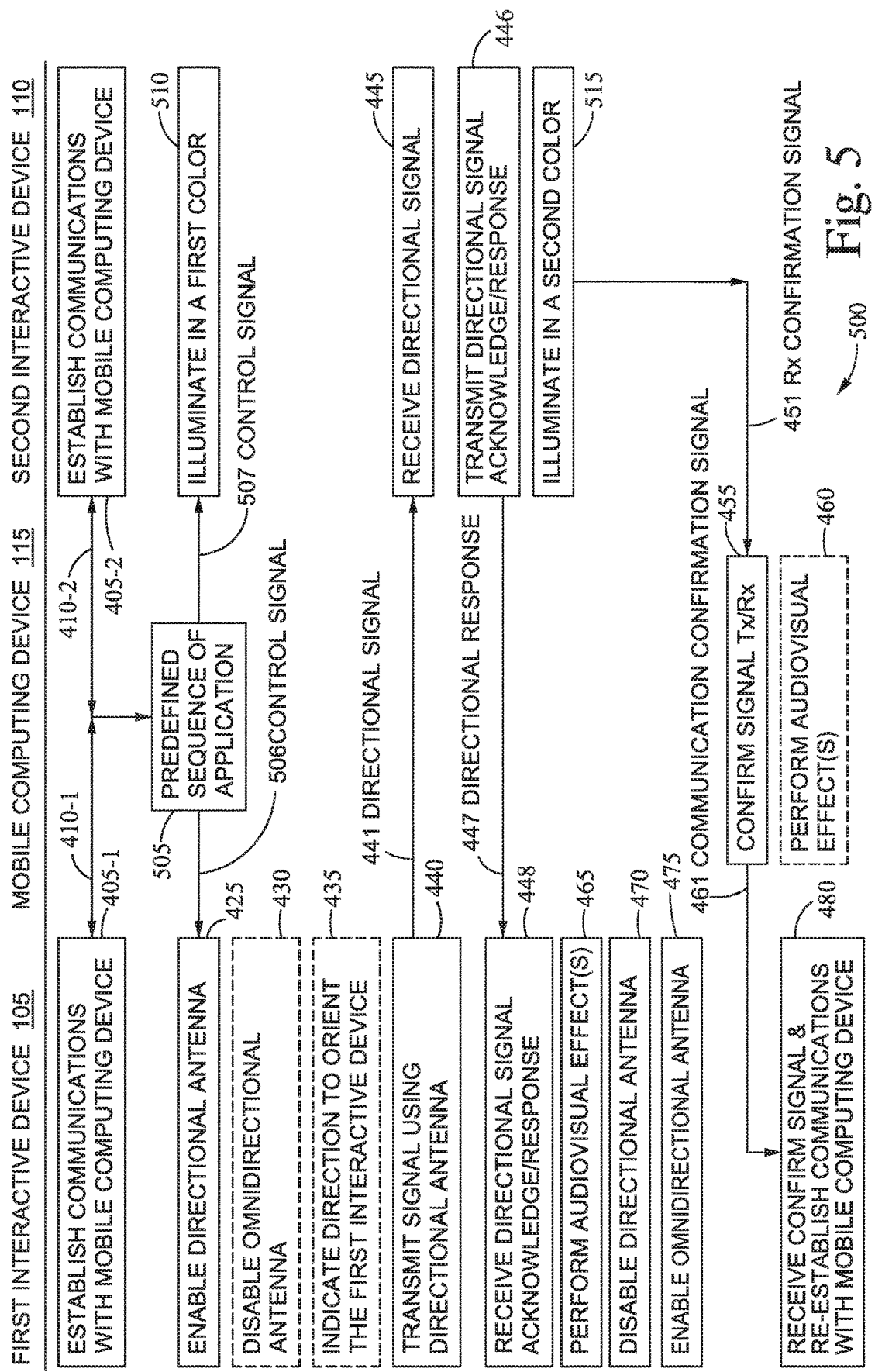
FIG. 5 is a diagram of an exemplary operational sequence using multiple interactive devices and a mobile computing device, according to one or more embodiments.

The timing shown in the diagram 300 will be discussed with further reference to FIG. 5, which is a diagram 500 of an exemplary operational sequence using multiple interactive devices and a mobile computing device. Operation 405-1 occurs prior to a time T1, where the first interactive device 105 establishes communications with the mobile computing device 115 using signals 410-1. In some embodiments, an omnidirectional antenna of the first interactive device 105 is used to communicate the signals 410-1. Operation 405-2 occurs prior to the time T1, where the second interactive device 110 establishes communications with the mobile computing device 115 using signals 410-2. Referring to the diagram 300, the magic scepter 215 may represent the first interactive device 105 and the model 225-1 may represent the second interactive device 110.

At operation 505, a predefined sequence of an application begins. The application is executed using one or more computer processors of the mobile computing device 115. The mobile computing device 115 transmits a first control signal 506 to the first interactive device 105, and a second control signal 507 to the second interactive device.

At operation 510, the second interactive device 110 is illuminated in a first color responsive to the control signal 507. At time T1, the models 225-1, 225-2, 225-3 are arranged in a first arrangement 305-1. In the first arrangement 305-1, the model 225-1 provides a first visual output 310 being illuminated in a first color (yellow or "Y"), while the models 225-2, 225-3 are not illuminated and provide no visual output. In the context of the storytelling or gameplay experience, illuminating the model 225-1 in the first color may indicate that the user should "aim" the magic scepter 215 at the model 225-1 to advance in the story or game.

At operation 425, the directional antenna of the first interactive device 105 is enabled responsive to the control signal 506. Optionally, the omnidirectional antenna of the first interactive device 105 is disabled at operation 430, and/or a direction is indicated to orient the first interactive device 105 at operation 435.

At operation 440, the first interactive device 105 transmits a signal (directional signal 441) using the directional antenna. One or both of the operations 425, 440 may be responsive to the user manipulation of the magic scepter 215 at time T2. At operation 445, the directional signal 441 is received by an antenna of the second interactive device 110 (model 225-1). At operation 446, the second interactive device 110 transmits a directional response 447 that is received by the directional antenna of the first interactive device 105 at operation 448. At an optional operation 465, the first interactive device 105 performs one or more audiovisual effects responsive to the directional response 447.

The first interactive device 105 may further disable the directional antenna at operation 470, and may enable the omnidirectional antenna at operation 475. In some embodiments, the directional response 447 causes the first interactive device 105 to transition from communicating using the directional antenna to using the omnidirectional antenna. For example, the directional response 447 may include a command for the first interactive device 105. In another example, the first interactive device 105 may be configured to transition to using the omnidirectional antenna responsive to the directional response 447.

In some embodiments, the first interactive device 105 may be configured to transition to using the omnidirectional antenna following the expiration of a timeout period following transmission of the directional signal 441. For example, the first interactive device 105 may not receive the directional response 447 if the first interactive device 105 is no longer oriented toward the second interactive device 110. Implementations of the first interactive device 105 having the timeout period may be separate from, or in conjunction with, implementations responsive to the directional response 447.

At an optional operation 515, the second interactive device 110 is illuminated in a second color responsive to the directional signal 441. Other audio, visual, and/or haptic outputs are also possible. The second interactive 110 may further transmit a receive (Rx) confirmation signal 451 to the mobile computing device 115. At time T3, the models 225-1, 225-2, 225-3 are arranged in a second arrangement 305-2. In the second arrangement 305-2, the model 225-1 provides a second visual output 315 being illuminated in a second color (green or "G") indicating that the signal transmitted using the directional antenna of the magic scepter 215 was successfully received by the model 225-1. According to the predefined sequence 190, the model 225-3 may provide a third visual output 320 in the first color (Y) to indicate that the user should next aim the magic scepter 215 at the model 225-3. The model 225-2 is not illuminated.

At operation 455, the mobile computing device 115 confirms, using the Rx confirmation signal 451, that the directional signal 441 was both successfully transmitted by the first interactive device 105 and received by the second interactive device 110. In some embodiments, the mobile computing device 115 at operation 460 performs one or more audiovisual effects responsive to confirmation of the successful transmission and receipt of the directional signal 441.

In one alternate embodiment, the mobile computing device 115 configures the second interactive device 110 (which may include multiple second interactive devices) in a short timed countdown mode while illuminated in the first color. If the second interactive device 110 is "hit" (that is, receives the directional signal 441 from the first interactive device 105), the Rx confirmation signal 451 is then relayed to the mobile computing device 115 to register/tally the hit.

In another alternate embodiment, the second interactive device 110 comprises multiple second interactive devices that are each enabled and/or illuminated. Any time that one of the second interactive devices is "hit", the hit is reported or confirmed with the mobile computing device 115 and the hit second interactive device may provide an additional output, such as illumination, haptics, sound, etc.

For each of the alternate embodiments discussed above, the first interactive device 105 may have a timeout period associated with the directional antenna, which may be predefined or set by the mobile computing device 115. When the timeout period expires, the first interactive device 105 may automatically switch back to transmitting using the omnidirectional antenna, allowing the first interactive device 105 to communicate with the mobile computing device 115.

In some embodiments, the mobile computing device 115 transmits a communication confirmation signal 461 to the first interactive device 105. For example, the communication confirmation signal 461 may be received by the omnidirectional antenna of the first interactive device 105. At operation 480, the first interactive device 105 receives the communication confirmation signal 461 and re-establishes communications with the mobile computing device 115 responsive thereto.

In this way, any one or more of the first interactive device 105, the second interactive device 110, and the mobile computing device 115 may be used to perform audiovisual effect(s) responsive to the second interactive device 110 receiving the directional signal 441 from the first interactive device 105.

Returning to FIG. 3, at time T4 the user manipulates the magic scepter 215 causing the directional antenna of the magic scepter 215 to be enabled, and a signal to be transmitted using the directional antenna. However, in this case the signal is not received by an antenna of the model 225-3. For example, the user may have aimed the magic scepter 215 poorly or may not have responded to the third visual output 320 quickly enough.

At time T5, the models 225-1, 225-2, 225-3 are arranged in a third arrangement 305-3. In the third arrangement 305-3, the model 225-3 provides a fourth visual output 325 being illuminated in a third color (red or "R") indicating that the signal transmitted using the directional antenna of the magic scepter 215 was not successfully received by the model 225-3. According to the predefined sequence 190, the model 225-2 may provide a fifth visual output 335 in the first color (Y) to indicate that the user should next aim the magic scepter 215 at the model 225-2. The model 225-1 is not illuminated.

At time T6, the user manipulates the magic scepter 215 causing the directional antenna of the magic scepter 215 to be enabled, and a signal to be transmitted using the directional antenna. The signal is received by an antenna of the model 225-2.

At time T7, the models 225-1, 225-2, 225-3 are arranged in a fourth arrangement 305-4. In the fourth arrangement 305-4, the model 225-2 provides a sixth visual output 340 being illuminated in the second color (G) indicating that the signal transmitted using the directional antenna of the magic scepter 215 was successfully received by the model 225-2. The models 225-1, 225-3 are not illuminated. According to the predefined sequence 190, the user need not aim the magic scepter 215 at any of the models 225-1, 225-2, 225-3. At time T8, the sequence 190 ends.

Figure 4:
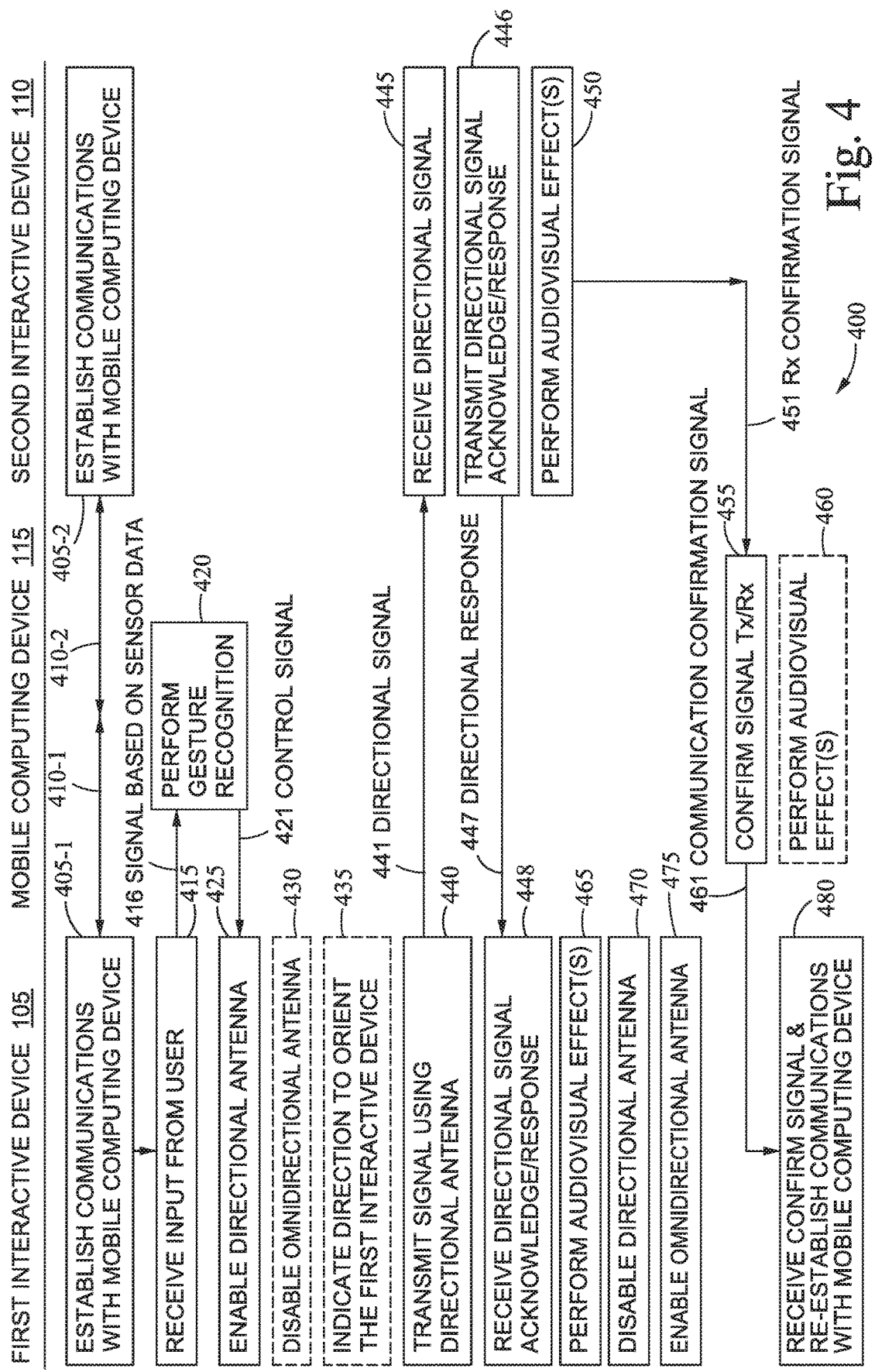
FIG. 4 is a diagram of an exemplary operational sequence using multiple interactive devices and a mobile computing device, according to one or more embodiments.

Next, FIG. 4 is a diagram 400 of an exemplary operational sequence using multiple interactive devices and a mobile computing device, according to one or more embodiments. The features illustrated in the diagram 400 may be used in conjunction with other embodiments discussed herein.

At operation 405-1, the first interactive device 105 establishes communications with the mobile computing device 115 using signals 410-1. In some embodiments, an omnidirectional antenna of the first interactive device 105 is used to communicate the signals 410-1. At operation 405-2, the second interactive device 110 establishes communications with the mobile computing device 115 using signals 410-2.

At operation 415, the first interactive device 105 receives an input from a user. Generally, the input corresponds to user manipulation of the first interactive device 105. The first interactive device 105 communicates a signal based on sensor data 416 to the mobile computing device 115, and the mobile computing device 115 performs gesture recognition at operation 420.

Responsive to an identified gesture, the mobile computing device 110 communicates a control signal 421 to the first interactive device 105 to enable a directional antenna at operation 425. Optionally, the omnidirectional antenna of the first interactive device 105 is disabled at operation 430, and/or a direction is indicated to orient the first interactive device 105 at operation 435.

At operation 440, the first interactive device 105 transmits a signal (directional signal 441) using the directional antenna. At operation 445, the directional signal 441 is received by an antenna of the second interactive device 110. At operation 446, the second interactive device 110 transmits a directional response 447 that is received by the directional antenna of the first interactive device 105 at operation 448. At an optional operation 465, the first interactive device 105 performs one or more audiovisual effects responsive to the directional response 447.

The first interactive device 105 may further disable the directional antenna at operation 470, and may enable the omnidirectional antenna at operation 475. In some embodiments, the directional response 447 causes the first interactive device 105 to transition from communicating using the directional antenna to using the omnidirectional antenna. For example, the directional response 447 may include a command for the first interactive device 105. In another example, the first interactive device 105 may be configured to transition to using the omnidirectional antenna responsive to the directional response 447.

In some embodiments, the first interactive device 105 may be configured to transition to using the omnidirectional antenna following the expiration of a timeout period following transmission of the directional signal 441. For example, the first interactive device 105 may not receive the directional response 447 if the first interactive device 105 is no longer oriented toward the second interactive device 110. Implementations of the first interactive device 105 having the timeout period may be separate from, or in conjunction with, implementations responsive to the directional response 447.

At operation 450, the second interactive device 110 performs one or more audiovisual effects responsive to the directional signal 441. For example, the second interactive device 110 may illuminate in a different color. The second interactive 110 may further transmit a receive (Rx) confirmation signal 451 to the mobile computing device 115.

At operation 455, the mobile computing device 115 confirms, using the Rx confirmation signal 451, that the directional signal 441 was both successfully transmitted by the first interactive device 105 and received by the second interactive device 110. In some embodiments, the mobile computing device 115 at operation 460 performs one or more audiovisual effects responsive to confirmation of the successful transmission and receipt of the directional signal 441.

In some embodiments, the mobile computing device 115 transmits a communication confirmation signal 461 to the first interactive device 105. For example, the communication confirmation signal 461 may be received by the omnidirectional antenna of the first interactive device 105. At operation 480, the first interactive device 105 receives the communication confirmation signal 461 and re-establishes communications with the mobile computing device 115 responsive thereto.

In this way, any one or more of the first interactive device 105, the second interactive device 110, and the mobile computing device 115 may be used to perform audiovisual effect(s) responsive to the second interactive device 110 receiving the directional signal 441 from the first interactive device 105.

Various embodiments above describe an operational sequence in which an interactive device communicates first using an omnidirectional antenna, and responsive to a predefined event transitions to communicating using a directional antenna. However, alternate embodiments may employ different operational sequences. In one embodiment, an interactive device communicates first using a directional antenna, and responsive to a predefined event transitions to communication using an omnidirectional antenna. For example, the interactive device may record a direct hit from a "blast" received using the directional antenna, and may then transmit information about the hit using the omnidirectional antenna, such as identification of the interactive device at which the blast originated, a number of the received blast, and/or a timing of receiving the blast.

In the preceding, reference is made to embodiments of the disclosure. However, it should be understood that the disclosure is not limited to specific described embodiments. Instead, any combination of the preceding features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the preceding aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method for use with a first interactive device, the method comprising:
 obtaining sensor data from one or more sensors of the first interactive device, wherein the one or more sensors comprise an inertial measurement unit, an absolute position sensor, or a relative position sensor;
 transmitting, based on the sensor data, a first signal to a mobile computing device using an omnidirectional antenna of the first interactive device;
 receiving, from the mobile computing device, a control signal indicating that the sensor data corresponds to a predefined gesture performed using the first interactive device;
 enabling, responsive to the control signal, a directional antenna of the first interactive device; and
 transmitting, responsive to performing a second predefined gesture with the first interactive device, a second signal to a second interactive device using the directional antenna, wherein the second interactive device is communicatively coupled with the mobile computing device,
 wherein an audiovisual effect is performed when the second signal is received at the second interactive device.

2. The method of claim 1, wherein the first interactive device is one of a body-worn or carried device.

3. The method of claim 2, further comprising:
 after receiving the control signal, indicating a direction to orient the first interactive device to thereby orient the directional antenna toward the second interactive device.

4. The method of claim 2,
wherein the second interactive device transmits a third signal to the mobile computing device indicating that the second signal was received by the second interactive device, and
wherein the audiovisual effect is performed using at least one of the first interactive device, the second interactive device, and the mobile computing device.

5. The method of claim 1, wherein the second interactive device is initially illuminated in a first color, and
wherein the audiovisual effect comprises illuminating the second interactive device in a second color different than the first color.

6. The method of claim 1, wherein enabling the directional antenna of the first interactive device comprises disabling the omnidirectional antenna using switching circuitry of the first interactive device.

7. The method of claim 1, wherein the predefined gesture comprises raising the first interactive device to a near-vertical orientation.

8. The method of claim 1, wherein the predefined gesture comprises waving the first interactive device in a circular motion.

9. The method of claim 8, wherein the circular motion occurs while the first interactive device is in a near-vertical orientation.

10. The method of claim 1, wherein the second predefined gesture comprises pressing a button of the first interactive device.

11. The method of claim 1, wherein the second predefined gesture comprises lowering the first interactive device to a near-horizontal orientation.

12. A system comprising:
a first interactive device comprising:
one or more sensors comprising an inertial measurement unit, an absolute position sensor, or a relative position sensor;
an omnidirectional antenna;
a directional antenna; and
controller circuitry configured to:
obtain sensor data from the one or more sensors;
transmit, based on the sensor data, a first signal to a mobile computing device using the omnidirectional antenna;
receive, from the mobile computing device, a control signal indicating that the sensor data corresponds to a predefined gesture performed using the first interactive device;
enable the directional antenna responsive to the control signal; and
transmit, responsive to performing a second predefined gesture with the first interactive device, a second signal using the directional antenna; and
a second interactive device configured to:
communicatively couple with the mobile computing device; and
perform an audiovisual effect responsive to receiving the second signal.

13. The system of claim 12, wherein the first interactive device is one of a body-worn or carried device.

14. The system of claim 13, wherein the controller circuitry is further configured to:
after receiving the control signal, indicate a direction to orient the first interactive device to thereby orient the directional antenna toward the second interactive device.

15. The system of claim 13, wherein the second interactive device is further configured to:
transmit a third signal to the mobile computing device indicating that the second signal was received by the second interactive device.

16. The system of claim 12, wherein the second interactive device is initially illuminated in a first color, and
wherein the audiovisual effect comprises illuminating the second interactive device in a second color different than the first color.

17. The system of claim 12, wherein enabling the directional antenna comprises disabling the omnidirectional antenna using switching circuitry of the first interactive device.

18. An apparatus comprising:
an omnidirectional antenna;
a directional antenna;
one or more sensors comprising an inertial measurement unit, an absolute position sensor, or a relative position sensor; and
controller circuitry configured to:
obtain sensor data from the one or more sensors;
transmit, based on the sensor data, a first signal to a mobile computing device using the omnidirectional antenna;
receive, from the mobile computing device, a control signal indicating that the sensor data corresponds to a predefined gesture performed using an interactive device;
enable the directional antenna responsive to the control signal; and
transmit, responsive to a second predefined gesture, a second signal to the interactive device using the directional antenna,
wherein an audiovisual effect is performed responsive to receiving the second signal at the interactive device.

19. The apparatus of claim 18, wherein the controller circuitry is further configured to:
after receiving the control signal, indicate a direction to orient the directional antenna toward the interactive device.

20. The apparatus of claim 18, further comprising:
switching circuitry coupled with the omnidirectional antenna and the directional antenna,
wherein enabling the directional antenna comprises disabling the omnidirectional antenna using the switching circuitry.

* * * * *